United States Patent
Zhang et al.

(10) Patent No.: US 10,085,041 B2
(45) Date of Patent: *Sep. 25, 2018

(54) METHOD FOR DEPTH LOOKUP TABLE SIGNALING

(71) Applicant: HFI Innovation Inc., Zhubei, Hsinchu County (TW)

(72) Inventors: Kai Zhang, Beijing (CN); Jicheng An, Beijing (CN); Xianguo Zhang, Beijing (CN); Han Huang, Beijing (CN)

(73) Assignee: HFI INNOVATION INC., Zhubei, Hinschu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,260

(22) Filed: Sep. 6, 2017

(65) Prior Publication Data

US 2018/0014029 A1    Jan. 11, 2018

Related U.S. Application Data

(63) Continuation of application No. 15/123,882, filed as application No. PCT/CN2015/074391 on Mar. 17, (Continued)

(51) Int. Cl.
*H04N 19/597* (2014.01)
*H04N 19/34* (2014.01)
(Continued)

(52) U.S. Cl.
CPC ........... *H04N 19/597* (2014.11); *H04N 19/34* (2014.11); *H04N 19/503* (2014.11); *H04N 19/70* (2014.11)

(58) Field of Classification Search
None
See application file for complete search history.

(56) References Cited

U.S. PATENT DOCUMENTS

2009/0161989 A1    6/2009  Sim
2009/0262798 A1   10/2009  Chiu
(Continued)

FOREIGN PATENT DOCUMENTS

CN    101222639 A    7/2008
CN    103491369 A    1/2014
(Continued)

OTHER PUBLICATIONS

International Search Report dated Jun. 23, 2015, issued in application No. PCT/CN2015/074391.
(Continued)

*Primary Examiner* — Mohammad J Rahman
(74) *Attorney, Agent, or Firm* — McClure, Qualey & Rodack, LLP

(57) ABSTRACT

A method and apparatus for depth lookup table (DLT) signaling in a three-dimensional and multi-view coding system. The method identifies one or more pictures to be processed. If one or more pictures contain depth data, then the method determines the DLT associated with said one or more pictures, applies predictive coding to the DLT based on the previous DLT, includes syntax related to the DLT in the PPS, and includes first bit-depth information related to first depth samples of the DLT in the PPS. The first bit-depth information is consistent with second bit depth information signaled in a sequence level. The method further signals the PPS in a video bitstream for a sequence including said one or more pictures. A circuit is also provided that embodies circuitry configured to carry out the operations specified above.

6 Claims, 4 Drawing Sheets

Related U.S. Application Data 2015, now Pat. No. 9,800,896, which is a continuation-in-part of application No. PCT/CN2014/073611, filed on Mar. 18, 2014.

(51) Int. Cl.
*H04N 19/503* (2014.01)
*H04N 19/70* (2014.01)

(56) References Cited

U.S. PATENT DOCUMENTS

| | | |
|---|---|---|
| 2011/0090959 A1 | 4/2011 | Wiegand |
| 2011/0228855 A1 | 9/2011 | Gao |
| 2012/0229602 A1 | 9/2012 | Chen |
| 2013/0022111 A1 | 1/2013 | Chen |
| 2013/0156215 A1 | 6/2013 | Hickerson |
| 2013/0182761 A1 | 7/2013 | Chen |
| 2013/0235072 A1 | 9/2013 | Longhurst |
| 2013/0294509 A1 | 11/2013 | Song |
| 2013/0342644 A1 | 12/2013 | Rusanovsky et al. |
| 2014/0253682 A1 | 9/2014 | Zhang |
| 2015/0036745 A1 | 2/2015 | Hsu |
| 2015/0078441 A1 | 3/2015 | Han |
| 2015/0350623 A1 | 12/2015 | Zhang |
| 2015/0350677 A1 | 12/2015 | Lim |
| 2015/0358643 A1 | 12/2015 | Zhang |
| 2016/0007005 A1* | 1/2016 | Konieczny ........... H04N 19/597 348/43 |
| 2016/0014434 A1 | 1/2016 | Liu et al. |
| 2016/0029036 A1* | 1/2016 | Jaeger ................. H04N 19/597 375/240.12 |
| 2016/0057452 A1 | 2/2016 | Li |
| 2016/0073131 A1 | 3/2016 | Heo |
| 2016/0330479 A1 | 11/2016 | Liu |
| 2016/0330480 A1 | 11/2016 | Liu |
| 2017/0006309 A1 | 1/2017 | Liu |
| 2017/0013276 A1 | 1/2017 | Chen |

FOREIGN PATENT DOCUMENTS

| | | |
|---|---|---|
| WO | WO 2014/000664 A1 | 1/2014 |
| WO | WO 2014/166100 A1 | 10/2014 |

OTHER PUBLICATIONS

Tech, G., et al.; "3D-HEVC Draft Text 3"; Joint Collaborative Team on 3D Video Coding Extension Development of ITU-T SG 16 WP 3 and ISO/IEC JTC 1/SC 29/WG 11, 7th Meeting: San Jose; JCT3V-G1001; Jan. 2014; pp. 1-94.

Zhang K. et al.; "AHG7: An efficient coding method for DLT in 3D-HEVC;" Joint Collaborative Team on 3D Video Coding Extension Development of ITU-T SG 16 WP 3 and ISO/IEC JTC 1/SC 29/ WG 11; Jul.-Aug. 2013; pp. 1-5.

Jager, F.; "CE6.H related: Results on Updating Mechanism for Coding of Depth Lookup Table (Delta-DLT);" Joint Oollaborative Team on 3D Video Coding Extension Development of ITU-T SG 16 WP 3 and ISO/IEC JTC 1/SC 29/ WG 11; Apr. 2013; pp. 1-13.

Zhao, X., et al.; "AHG7: On signaling of DLT for depth coding;" Joint Collaborative Team on 3D Video Coding xtension Development of ITU-T SG 16 WP 3 and ISO/IEC JTC 1/SC 29/ WG 11; Jul.-Aug. 2013; pp. 1-8.

\* cited by examiner

METHOD FOR DEPTH LOOKUP TABLE SIGNALING

CROSS REFERENCE TO RELATED APPLICATIONS

The present application is a continuation of U.S. patent application Ser. No. 15/123,882, filed Sep. 6, 2016, which is a national phase application of PCT patent application no. PCT/CN2015/074391, filed Mar. 17, 2015, which is a continuation-In-Part of PCT Patent Application, Ser. No. PCT/CN2014/073611, filed on Mar. 18, 2014. The priority applications are all hereby incorporated by reference in their entireties.

TECHNICAL FIELD

The present invention relates to three-dimensional and multi-view video coding. In particular, the present invention relates to method for Depth Lookup Table signaling.

BACKGROUND

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. A straightforward approach may simply apply conventional video coding techniques to each single-view video sequence independently and disregard any correlation among different views. Such straightforward techniques would result in poor coding performance. In order to improve multi-view video coding efficiency, multi-view video coding always exploits inter-view redundancy. The disparity between two views is caused by the locations and angles of the two respective cameras.

Depth lookup table (DLT) has been adopted into 3D-HEVC. Very often, there are only limited values appearing in the depth component. Therefore, DLT is a compact representation of the valid values in a block. When a CU is coded in Intra simplified depth coding (SDC) mode or depth map modeling (DMM) mode, DLT is used to map the valid depth values to DLT indexes. FIG. 1 demonstrates an example of DLT representation of depth values in a picture. While the range of depth values is from 0 to 255, only 5 depth values (i.e., 50, 108, 110, 112 and 200) appear in the picture. Accordingly, the DLT consists of 5 values with indexes from 0 to 4. The DLT is signaled in the picture parameter set (PPS) and it is up to the encoder to generate the DLT.

In the current 3D-HEVC (Three-Dimensional Coding Based on High Efficiency Video Coding) draft standard, DLT is signaled as an extension to picture parameter set (PPS). The syntax elements related to DLT signaling are described in the following tables.

As shown in Table 1, the DLT parameter information, pps_dlt_parameters( ) is incorporated in the PPS if the PPS extension flag, pps_extension_type_flag[0] is asserted.

TABLE 1

| | Descriptor |
|---|---|
| pic_parameter_set_rbsp( ) { | |
| ... | u(1) |
| pps_extension_flag | u(1) |
| if( pps_extension_flag ) { | |
|   for ( i = 0; i < 8; i++ ) | |
|     pps_extension_type_flag[ i ] | u(1) |
|   if( pps_extension_type_flag[ 0 ] ) | |
|     poc_reset_info_present_flag | u(1) |
|   if( pps_extension_type_flag[ 2 ] ) | |
|     pps_dlt_parameters( ) | u(1) |
|   if( pps_extension_type_flag[ 7 ] ) | |
|     while( more_rbsp_data( ) ) | |
|       pps_extension_data_flag | u(1) |
| } | |
| rbsp_trailing_bits( ) | |
| } | |

The syntax structure for the DLT parameter information, pps_dlt_parameters( ) is shown in Table 2. When the flag, dlt_present_flag has a value of 1, information related to DLT is incorporated in pps_dlt_parameters( ) as shown in Table 2. The inter-view DLT prediction flag, inter_view_dlt_pred_enable_flag[i] equal to 1 indicates that the i-th depth lookup table is predicted from the depth lookup table of the 0-th depth lookup table. On the other hand, the flag, inter_view_dlt_pred_enable_flag[i] equal to 0 indicates the i-th depth lookup table is not predicted from any other depth lookup table.

TABLE 2

| | Descriptor | Note |
|---|---|---|
| pps_dlt_parameters( ) { | | |
|   dlt_present_flag | u(1) | |
|   if( dlt_present_flag) { | | |
|     pps_depth_layers_minus1 | u(6) | |
|     pps_bit_depth_for_depth_views_minus8 | u(4) | |
|     for( i=0; i <= pps_depth_layers_minus1; i++) { | | |
|       dlt_flag[ i ] | u(1) | |
|       if( dlt_flag[ i ] ) { | | |
|         inter_view_dlt_pred_enable_flag[ i ] | u(1) | |
|         if( !inter_view_dlt_pred_enable_flag[ i ] ) | | |
|           dlt_bit_map_rep_flag[ i ] | u(1) | |
|         if( dlt_bit_map_rep_flag[ i ] ) | | |
|           for( j = 0; j <= depthMaxValue; j++ ) | | |
|             dlt_bit_map_flag[ i ][ j ] | u(1) | |
|         else | | |
|           entry_table( i ) | | |
|       } | | |
|     } | | |
|   } | | |
| } | | |

The DLT signaling according to the existing 3D-HEVC standard has some issues. First, inter-view prediction can be applied to DLT as indicated by a corresponding flag, inter_view_dlt_pred_enable_flag[i]. If this flag is set to 1, the i-th DLT is predicted from the 0-th DLT. On the other hand, dlt_flag[i] indicates whether the i-th DLT exists. Therefore, if dlt_flag[0] is 0 and inter_view_dlt_pred_enable_flag[i] with i>0 is 1, the i-th DLT is predicted from a non-existed DLT.

In the existing 3D-HEVC standard, pps_bit_depth_for_depth_views_minus8 is signaled to indicate the bit-depth for samples of the depth component in the picture.

However, the bit-depth for samples in the depth component is also signaled in the sequence level as indicated by bit_depth_luma_minus8 which is signaled in sequence parameter set (SPS). Therefore. There is potential contradiction between these two syntax elements if these two syntax elements are different.

In the existing 3D-HEVC standard, the DLT is signaled in all PPSs of the bit-stream including the texture video in all views since the flag dlt_present_flag can be set to 1 for the texture data. However, the DLT is only required by the depth component of each view. According to the existing 3D-HEVC standard, the DLT is signaled in four PPSs in total when there are 3 views. As shown in FIG. 2, three PPSs are sent for the texture component for three views, (i.e., T0, T1 and T2) individually. On the other hand, only one PPS is used and shared by the depth component for all three views (i.e., D0, D1 and D2). Therefore, 4 copies of the same content of DLT will be signaled in the 4 PPSs repeatedly with an obvious redundancy.

It is desirable to develop methods to overcome these issues without causing noticeable impact on the performance.

SUMMARY

A method and apparatus for depth lookup table (DLT) signaling in a three-dimensional and multi-view coding system are disclosed. A method and apparatus for depth lookup table (DLT) signaling in a three-dimensional and multi-view coding system. The method identifies one or more pictures to be processed. If one or more pictures contain depth data, then the method determines the DLT associated with said one or more pictures, applies predictive coding to the DLT based on the previous DLT, includes syntax related to the DLT in the PPS, and includes first bit-depth information related to first depth samples of the DLT in the PPS. The first bit-depth information is consistent with second bit depth information signaled in a sequence level. The method further signals the PPS in a video bitstream for a sequence including said one or more pictures.

In another embodiment of the application, a circuit is also provided that embodies circuitry configured to carry out the operations specified above.

DETAILED DESCRIPTION

Figure 1:
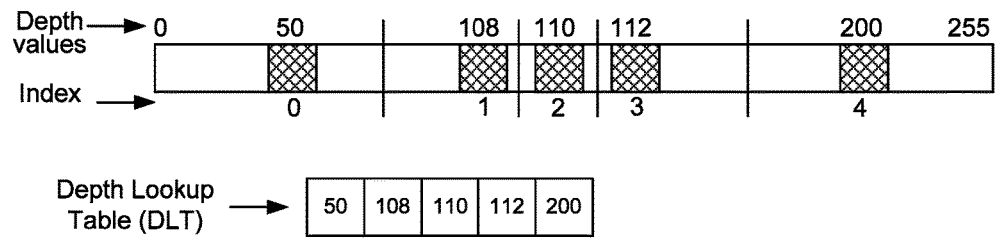
FIG. 1 illustrates an example of depth lookup table (DLT), where the table consists of five entries corresponding to 50, 108, 110, 112 and 200 indicated by indexes 0 through 4.
Figure 2:
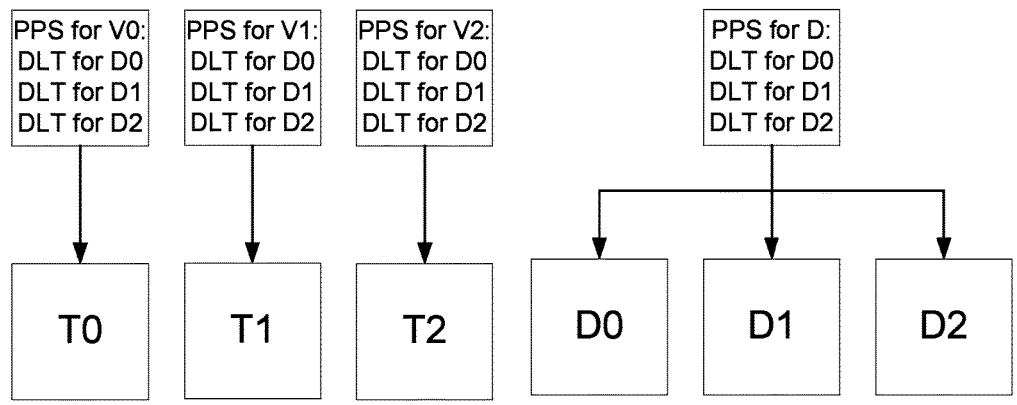
FIG. 2 illustrates an example of depth lookup table (DLT) signaling in the picture parameter set (PPS) for the texture component and the depth component according to conventional method.

As mentioned before, there are various issues with the depth lookup table (DLT) signaling in the existing High Efficiency Video Coding (HEVC) based 3D video coding. Accordingly, embodiments of the present invention are disclosed to overcome these issues. The following description is of the best-contemplated mode of carrying out the invention. This description is made for the purpose of illustrating the general principles of the invention and should not be taken in a limiting sense. The scope of the invention is best determined by reference to the appended claims.

One aspect of the present invention addresses validity of DLT prediction. As shown in the PPS DLT parameter syntax of the existing 3D-HEVC, predictive DLT coding is allowed for all depth layers regardless of whether the depending DLT exists or not. In one embodiment, whether a corresponding DLT exists for predicting a current DLT is checked first. If the corresponding DLT exists, predictive DLT coding is allowed for the current DLT to use the corresponding DLT as a predictor. If the corresponding DLT does not exist, predictive DLT coding is not applied to the current DLT regardless of whether the inter-view DLT prediction is enabled or not as indicated by an inter-view DLT prediction enable flag, inter_view_dlt_pred_enable_flag[i]. Alternatively, if the corresponding DLT required for predicting the i-th DLT does not exist, the flag inter_view_dlt_pred_enable_flag[i] is forced to be 0. In another embodiment, the flag inter_view_dlt_pred_enable_flag[i] is inferred as 0 if the DLT for predicting the i-th DLT does not exist.

An exemplary syntax table to incorporating an embodiment of the present invention is shown in Table 3. For the i-th DLT, the flag inter_view_dlt_pred_enable_flag[i] is incorporated only when the 0-th DLT exists, i.e., dlt_flag[0] being 1.

TABLE 3

| if( dlt_flag[ i ] ) { |  |
| if(dlt_flag[0]) |  |
|    inter_view_dlt_pred_enable_flag[ i ] | u(1) |

When the flag inter_view_dlt_pred_enable_flag[i] is 1 and the DLT that is originally used to predict the i-th DLT does not exist, the predictor for the i-th DLT can be changed to another DLT that exists. Instead of changing to an existing DLT, a predefined DLT can be used in this case as well. For example, the predefined DLT may include all possible values, such as 0, 1, . . . , 255, in the depth component. In another example, the predefined DLT contains no values.

Another aspect of the present invention addresses the consistency of bit depth information in different layers of the syntax. For example, the consistency of the bit-depth indication can be checked for the sequence level. To be specific, all bit-depth indications for depth data signaled in a video sequence must be the same as the bit-depth indication signaled in the sequence parameter set (SPS). Also, the PPS level bit depth indication (i.e., pps_bit_depth_for_depth_views_minus8) is set to be the same as the SPS level bit depth indication (i.e., bit_depth_luma_minus8).

In another embodiment, the bit depth consistency is achieved by scaling when the bit depth indications are different in different levels. For example, depth values of the DLT signaled in the PPS can be scaled if the PPS level bit depth indication, pps_bit_depth_for_depth_views_minus8 and the SPS level bit depth indication, bit_depth_luma_minus8 are different. For example, a depth value D of the DLT can be scaled according to D'=(D+offset)>>(pps_bit_depth_for_depth_views_minus8−bit_depth_luma_minus8) if pps_bit_depth_for_depth_views_minus8 is greater than bit_depth_luma_minus8. In another example, the scaling can be done according to D'=D<<(bit_depth_luma_minus8−pps_bit_depth_for_depth_views_minus8) if pps_bit_depth_for_depth_views_minus8 is lower than bit_depth_luma_minus8. The offset can be any integer such as 0 or (1<<(pps_bit_depth_for_depth_views_minus8−bit_depth_luma_ minus8−1)).

Figure 3:
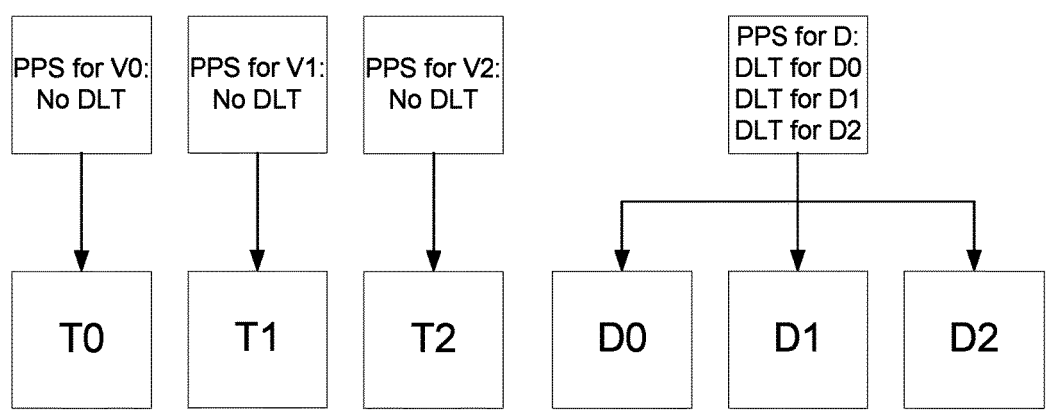
FIG. 3 illustrates an example of depth lookup table (DLT) signaling in the picture parameter set (PPS) for the texture component and the depth component according to an embodiment of the present invention.
Figure 4:
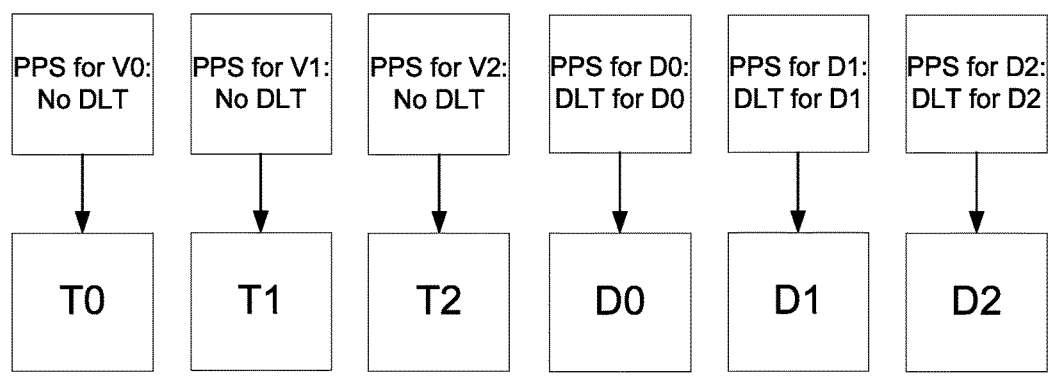
FIG. 4 illustrates another example of depth lookup table (DLT) signaling in the picture parameter set (PPS) for the texture component and the depth component according to an embodiment of the present invention.

Another aspect of the present invention addresses redundancy in the DLT signaling. Since the DLT is not needed by the texture data, DLT is not signaled in the PPS for the texture component. In other words, DLT is not signaled in the PPS for the texture only layer. On the other hand, the DLT for the depth data of all views can be signaled in a single PPS that is shared by depth components of all views as shown in FIG. 3. Alternatively, the DLT for the depth data of each view can be signaled in an individual PPS that is used by the particular depth component of the corresponding view as shown in FIG. 4.

In one embodiment, one PPS may only signal the DLT for the depth component associated with one view only. In other words, one PPS only signal the DLT for one layer. In another embodiment, a slice may use the DLT signaled in the PPS that contains PPS identification, pps_pic_parameter_set_id with the same value as the slice identification, slice_pic_parameter_set_id in the slice header for this slice.

In one embodiment, the DLT signaled in one PPS, noted as P1, can be predicted by a DLT signaled in a different PPS, noted as P0. Furthermore, the pps_pic_parameter_set_id of P0 can be signaled in P1 to locate the PPS (i.e., P0) containing a DLT to be used as a predictor for the DLT in PPS P1.

Figure 5:
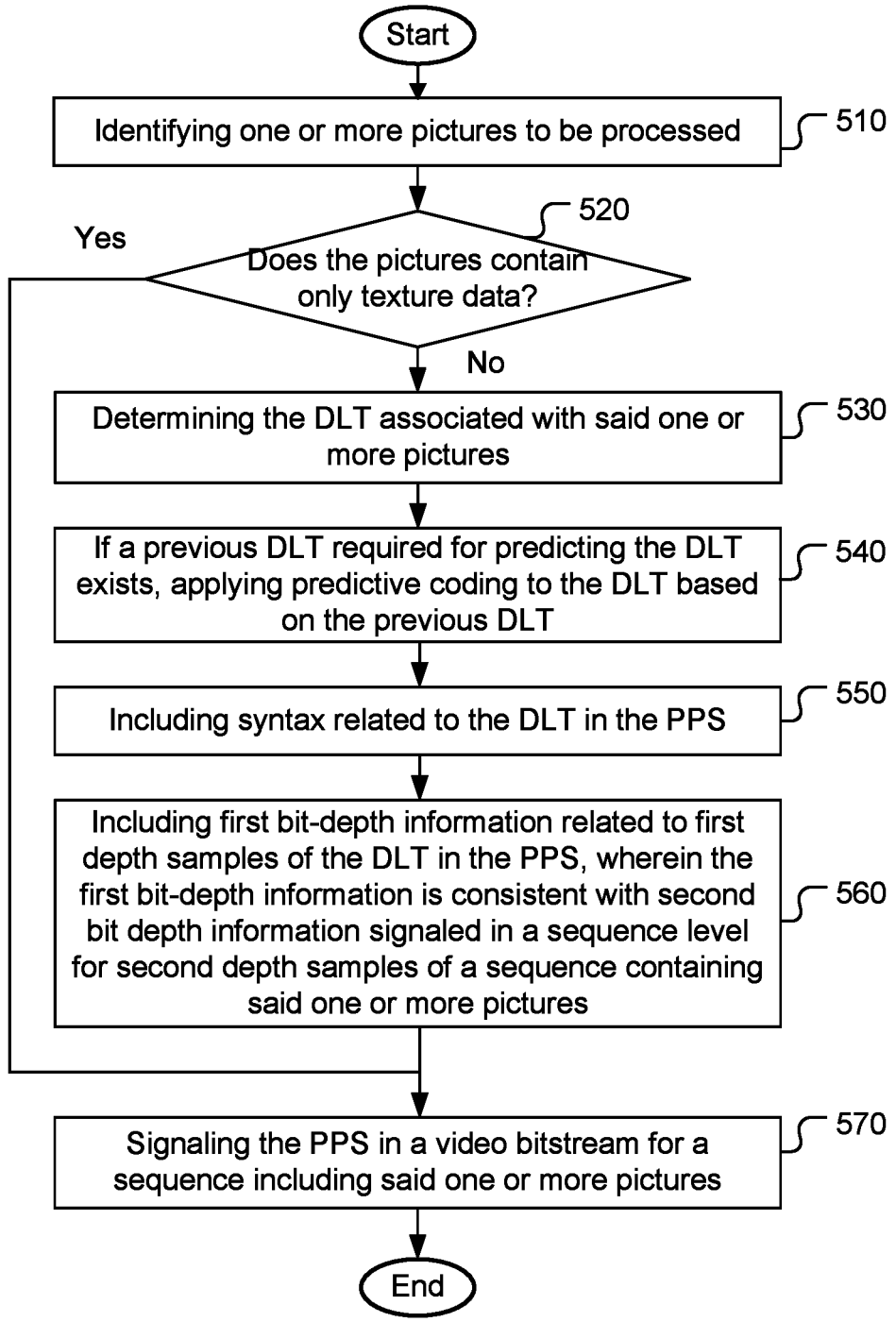
FIG. 5 illustrates an exemplary flowchart of depth lookup table (DLT) signaling for a 3D or multi-view coding system according to an embodiment of the present invention.

FIG. 5 illustrates an exemplary flowchart of depth lookup table (DLT) signaling for a 3D or multi-view coding system according to an embodiment of the present invention. The system identifies one or more pictures to be processed as shown in step 510. Whether said one or more pictures contain only texture data is checked in step 520. If the result is "Yes", the process goes to step 570. If the result is "No", the process goes to step 530. In step 530, the DLT associated with said one or more pictures is determined. If a previous DLT required for predicting the DLT exists, predictive coding is applied to the DLT based on the previous DLT as shown in step 540 and syntax related to the DLT is included in the PPS as shown in step 550. Furthermore, first bit-depth information related to first depth samples of the DLT is included in the PPS as shown in step 560. The first bit-depth information is consistent with second bit-depth information signaled in a sequence level for second depth samples of a sequence containing said one or more pictures. The PPS is then signaled in a video bitstream for a sequence including said one or more pictures as shown in step 570.

The flowchart shown above is intended to illustrate an example of 3D/multi-view coding using DLT signaling in three-dimensional and multi-view coding according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention may correspond to one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of depth coding using a depth lookup table (DLT) in a three-dimensional and multi-view coding system, the method comprising:
   identifying one or more pictures to be processed;
   if said one or more pictures contain depth data:
   determining the DLT associated with said one or more pictures;
   applying predictive coding to the DLT based on the previous DLT;
   including syntax related to the DLT in the PPS; and
   including first bit-depth information related to first depth samples of the DLT in the PPS, wherein the first bit-depth information included in the PPS is consistent with second bit depth information signaled in a sequence level; and
   signaling the PPS in a video bitstream for a sequence including said one or more pictures.

2. The method of claim 1, wherein the second bit depth information signaled in the sequence level corresponds to luma samples.

3. The method of claim 1, wherein the second bit depth information signaled in the sequence level is bit_depth_luma_minus8.

4. The method of claim 1, wherein the second bit depth information signaled in the sequence level is for second depth luma samples of a sequence containing said one or more pictures.

5. The method of claim 1, wherein first bit depth value indicated by the first bit depth information is the same as second bit depth value indicated by the second bit-depth information.

6. An apparatus for depth coding using a depth lookup table (DLT) in a three-dimensional and multi-view coding system, the apparatus comprising one or more electronic circuits configured to:
   identifying one or more pictures to be processed;
   if said one or more pictures contain depth data:
   determining the DLT associated with said one or more pictures;
   applying predictive coding to the DLT based on the previous DLT;
   including syntax related to the DLT in the PPS; and
   including first bit-depth information related to first depth samples of the DLT in the PPS, wherein the first bit-depth information included in the PPS is consistent with second bit depth information signaled in a sequence level; and
   signaling the PPS in a video bitstream for a sequence including said one or more pictures.

\* \* \* \* \*